May 25, 1965 H. J. MODREY 3,185,531

SHAFT BEARING

Filed April 8, 1963 3 Sheets-Sheet 1

INVENTOR.
HENRY J. MODREY
BY Kane and Nydick
ATTORNEYS

May 25, 1965  H. J. MODREY  3,185,531
SHAFT BEARING
Filed April 8, 1963  3 Sheets-Sheet 2
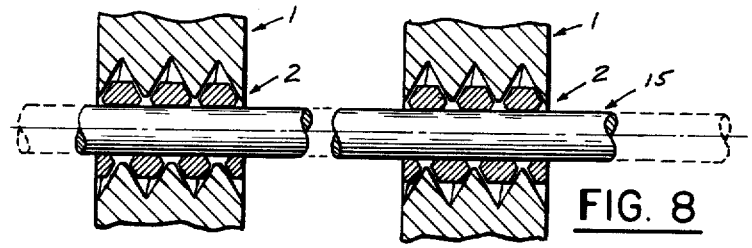
FIG. 8
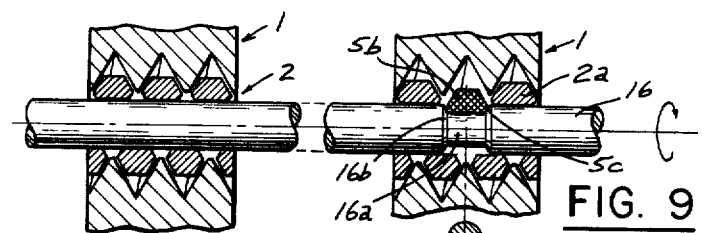
FIG. 9
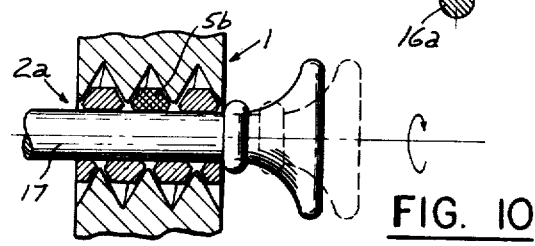
FIG. 10
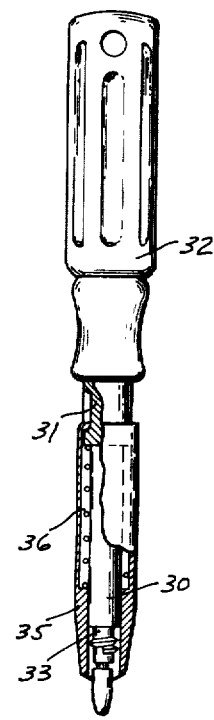
FIG. 14
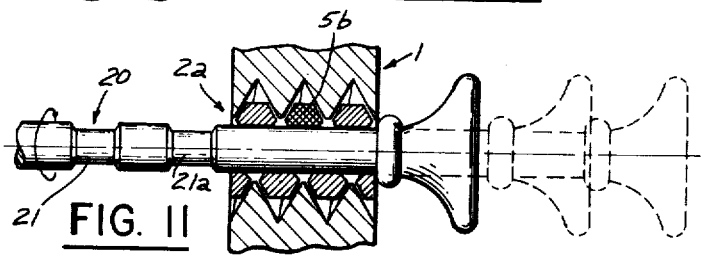
FIG. 11
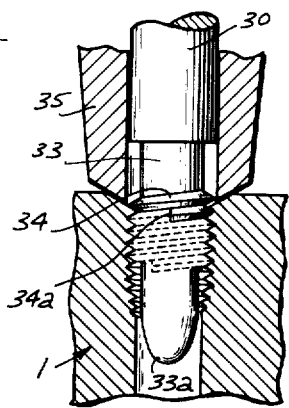
FIG. 15
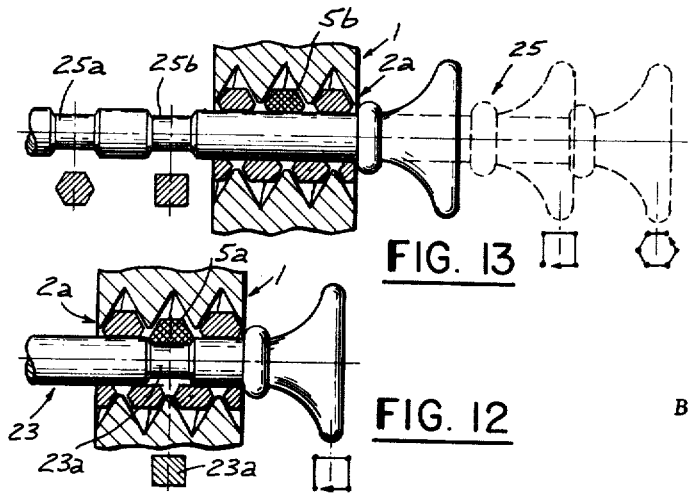
FIG. 13
FIG. 12
INVENTOR.
HENRY J. MODREY
BY Hane and Nydick
ATTORNEYS May 25, 1965   H. J. MODREY   3,185,531
SHAFT BEARING
Filed April 8, 1963   3 Sheets-Sheet 3

INVENTOR.
HENRY J. MODREY
BY Hane and Nydick
ATTORNEYS

United States Patent Office 3,185,531
Patented May 25, 1965

3,185,531
SHAFT BEARING
Henry J. Modrey, 158 Eagle Drive, Stamford, Conn.
Filed Apr. 8, 1963, Ser. No. 271,136
9 Claims. (Cl. 308—4)

The present invention relates to bushings or bearings for rotatably and/or slidably seating a shaft or rod.

It is a broad object of the invention to provide a novel and improved bearing which can be rapidly and simply installed in a mounting opening in a supporting base and removed from such mounting opening when desired, for instance for replacement.

It is also a broad object of the invention to provide a novel and improved bearing, the structure of which inherently permits precision manufacture by very inexpensive production techniques. As will be pointed out more fully hereinafter, a bearing according to the invention comprises a coil spring. The wire from which the coil is wound can be readily drawn to precision limits by conventional and inexpensive production methods. As a result the bearing embodies automatically the precision which can be obtained in a conventional bearing only by boring and lapping pieces of metal individually. In other words, the precision work necessary to obtain the precision bearings of the invention is transferred to the drawing die and the spring winder, that is, to production tools.

A more specific object of the invention is to provide a novel and improved bearing which has a considerable inherent springiness or give, whereby friction between the bearing member and the seated member is reduced and danger of binding or seizing of the seated member is practically eliminated. Furthermore, the inherent springiness and give compensate automatically for misalignment or bending of a shaft or rod seated in the bearing within a comparatively wide range.

Another more specific object of the invention is to provide a novel and improved bearing in which the clearance of the bearing is self-adjusting due to the inherent capability of the bearing of adjusting itself to variations in the diameter of the shaft or rod to be seated in the bearing. Due to the structure of the bearing the same will simply expand when a shaft of increased diameter is inserted in the same.

A still further specific object of the invention is to provide a novel and improved bearing in which the heat developed by rotation of a shaft in the bearing is very effectively and rapidly dissipated due to slots or gaps in the bearing surface which are inherent in the structure of the bearing.

It is also a more specific object of the invention to provide a novel and improved bearing which permits a wide latitude in respect to the properties of the material used for the supporting base. The bearing may be installed in a metallic or non-metallic base, including a base made of a comparatively brittle and fragile material, such as thin-walled plastics, since the inherent springiness of the bearing will cushion the load or pressure acting upon the supporting base.

A further and more specific object of the invention is to provide a novel and improved bearing which has the advantage that the material from which the bearing is made may be freely selected as to hardness, friction coefficient, costs, etc. in accordance with the specific requirements of the application of the bearing.

It is also a more specific object of the invention to provide a novel and improved bearing which is self-lubricating for a long period of time; more specifically, a bearing according to the invention will release stored lubricant only when and as needed. Such self-lubricating action is achieved without requiring special attachments or accessories by the structure of the bearing as such.

Another more specific object of the invention is to provide a novel and improved bearing which is capable of releasably retaining a seated shaft or rod in a predetermined axial and/or rotational position, thereby rendering the bearing highly advantageous for use in connection with numerous types of mechanisms and electrical or electronic control and switching apparatus. Furthermore, the bearing may be advantageously used as a high quality and inexpensive thrust bearing replacing locking assemblies such as nut and washer and groove-spring clip assemblies frequently used to secure a rotary shaft in a required axial position. The shaft of a small motor may, for instance be pushed into the bearing until it is automatically retained in its proper axial position.

It is also a specific object of the invention to provide a novel and improved bearing in which a shaft or rod seated in the bearing can be retained, both longitudinally and rotationally, in a desired position by braking action. Such braking of the seated member is highly useful in connection with numerous automotive and aviation control devices.

Still another more specific object of the invention is to provide a novel and improved bearing which is eminently suitable for effecting electric contact or grounding contact between a moving, especially a rotary, conductive member and a stationary conductive member due to the high and constant contact pressure between the bearing and the moving member seated therein. In other words, the bearing is capable of functioning in the manner of slip rings and similar components for effecting conductive connection between a movable conductor and a stationary conductor.

A still further specific object of the invention is to provide a novel and improved bearing which, due to its structure, lends itself to "click" stops in selected longitudinal and rotational positions of a shaft or rod seated in the bearing. Such "click" stops indicate audibly when a shaft or control rod has reached the selected one of several predetermined positions. Click stops are frequently used in switch and control equipment and require in such equipment as heretofore known special components which correspondingly increase the manufacturing costs of the equipment, whereas equipment using bearings according to the invention does not require such additional components.

Another object of the invention is to provide a novel and improved bearing, especially for use in connection with electrical equipment, in which the contact resistance between the bearing and members seated therein is considerably reduced by using as lubricant a graphite compound or other electrically conductive compound. As previously described, such lubricant will be gradually and automatically released, thus continuously causing a reduction of the ohmic resistance between the bearing and the member seated therein.

It is also an object of the invention, allied with the preceding ones, to provide a novel and improved tool for rapidly, safely and conveniently installing and removing a bearing according to the invention.

The basic concept of a bushing or bearing according to the invention resides in providing a coil insert, the windings of which define externally a plurality of threads threadedly engageable with the wall of a mounting hole to anchor the coil insert in such hole, and internally a plurality of axially alingned lands. The lands in conjunction constitute a cylindrical surface, the continuity of which is interrupted only by the narrow gaps or slots caused by the pitch of the coil windings. The intermittent cylindrical surface formed by the lands constitutes the bearing surface for the shaft or rod to be seated.

As it is evident from the previous description, the windings of the coil insert function as threads only at the outside of the insert while the inside of the windings perform no thread functions, but constitute a cylindrical bearing surface. Such difference in function between the inside and the outside of the coil insert according to the invention is basically different from the function of the known coil inserts that are used to replace stripped internal threads or to provide internal threads in a smooth mounting hole. The windings of such known coil insert do and must function as threads at both the outside and the inside; at the outside to anchor the insert in its hole, and at the inside to receive a threaded member in threaded engagement. Such basic difference in function between a coil insert according to the invention constituting a bearing or bushing and the known coil insert constituting a replacement for a worn-out internal thread or providing an internal thread in a smooth hole, manifests itself in basic differences in structure. The wire from which a known coil insert is formed has generally a diamond shaped cross section and in any event a cross section which defines an inner and an outer thread, that is a double thread, whereas a wire used for forming a coil according to the invention must have a substantially flat surface on its side facing the interior of the coil to form the afore-described, spirally slotted or intermittent cylindrical bearing surface. A wire having a cross section defining a truncated triangle or trapezium is generally suitable, the wire being so wound that the flat base faces inwardly.

Other and further objects, features and advantages of the invention will be pointed out hereinafter and set forth in the appended claims forming part of the application.

In the accompanying drawing several embodiments of the invention are shown by way of illustration and not by way of limitation.

In the drawing:

FIG. 8 is a double bearing for seating a lengthwise slidable and/or rotatable shaft or rod as may be used in automotive and aircraft control apparatus.

FIG. 9 is a modification of FIG. 8 in that one of the two bearings includes a special winding for releasably retaining a rotatable and/or lengthwise slidable rod or shaft in a predetermined axial position, and for preventing involutary rotational or lengthwise displacement of the shaft or rod.

FIG. 10 is a sectional view of a bearing in which a selected coil winding is so arranged that it will exert a braking action in lengthwise and/or rotational direction upon the shaft or rod inserted in the bearing.

FIG. 11 is a sectional view of a bearing for releasably retaining a lengthwise displaceable and/or rotatable control rod in a selected one of several predetermined lengthwise positions.

FIG. 12 is a sectional view of a bearing for releasably retaining a control rod in a selected one of several predetermined rotational positions.

FIG. 13 is a sectional view of a bearing for selectively retaining a control rod in selected ones of predetermined rotational and lengthwise positions.

FIG. 14 is a view, partly in section, of a tool for inserting a bearing according to the invention into a mounting hole, in particular a bearing with the special retaining means shown in FIG. 7.

FIG. 15 is a fragmentary sectional view of the tool of FIG. 14 while being used to insert a bearing into a threaded bore.

Figure 1:
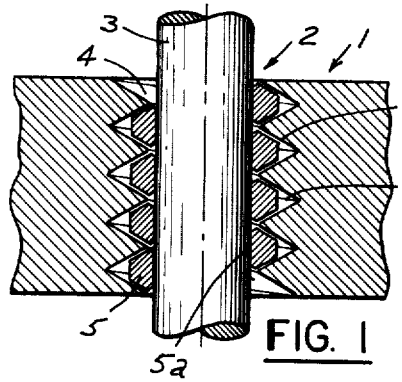
FIG. 1 is a lengthwise sectional view of a bearing according to the invention inserted in a pre-threaded bore and seating a shaft or rod.

Referring now to the figures in detail, FIG. 1 shows a support member 1, a bearing 2 fitted in the support member and a shaft 3 inserted in the bearing. The shaft is a rotating one or is axially slidable in reference to the bearing.

The support member has a threaded mounting hole 4. The threads are shown as sharp-edged threads, but threads of other configurations such as blunted or rounded threads may also be provided. While the support member is shown as a metal body, it may also be a body made of suitable plastics. The mounting member is shown in fragmentary fashion since the configuration thereof is not essential for the invention. In other words, the shape of the support member may be selected in accordance with the specific application and the support member may be stationary or movable.

Bearing 2 is formed by a coil spring 5 having any desired number of windings. The material from which the coil spring is wound may also be selected in accordance with the specific requirements of the application. For instance, materials that are specially suited for bearings such as beryllium copper or special bearing alloys may be used.

According to the invention the cross sectional configuration of the coil windings is selected so that the inwardly facing surfaces of the windings define in conjunction an intermittent cylindrical bearing surface and, more specifically, a spirally slotted cylindrical bearing surface. The outwardly facing surfaces of the windings form screw threads engageable with the threads in the mounting hole or bore of the support member, as is shown in FIG. 1, to anchor the bearing in the support member. As it is evident, the friction between the flanks of the springy coil windings and the flanks of the teeth in the mounting hole will generally restrain the coil spring against rotation if and when shaft 3 is rotated. Preferably, the thread-winding direction of the bearing should be identical with the direction of shaft rotation. This tends to anchor the bearing firmly in its thread.

Figure 6:
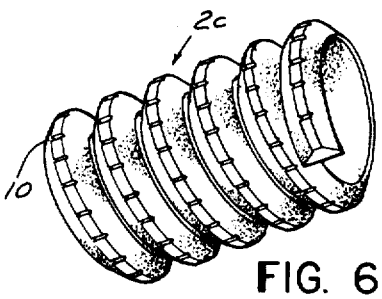
FIG. 6 is a perspective view of a bearing provided with special retaining means for locking the bearing strongly in a fixed rotational position in a mounting hole.
Figure 7:
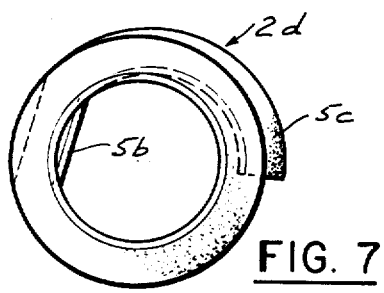
FIG. 7 is a plan view of a bearing including a special coil winding for locking a seated shaft or rod in a predetermined rotational and/or axial position and a special coil winding for anchoring the bearing strongly in its mounting hole.

If the direction of shaft rotation could change, or if an involuntary screwing-out of the bearing must be avoided under all circumstances, one of the special configurations shown in FIGS. 6 and 7 should be selected, or the bearing should be retained by a cover plate.

The outer surfaces of the coil windings defining the external threads may be pointed, but it is generally more convenient and advantageous for a reason which will be pointed out hereinafter to blunt or flatten the external threads whereby the coil windings obtain the illustrated shape of approximately a trapezium or truncated triangle.

To attain the aforedescribed bearing function of the coil spring on the inside thereof, the inwardly facing surface portions of all the windings define lands 5a. Each of the lands constitutes part of a cylindrical surface and all these surfaces are axially aligned whereby the lands in conjunction form the aforementioned spirally slotted cylindrical bearing surface.

As it is indicated in FIG. 1, the coil windings have a certain amount of give in relation to the rod or shaft because the whole coil may move inside the thread. As a result the individual windings of the coil may perform limited movements within the respective threads. As a result, a bearing according to the invention has inherently considerable elasticity or give which reduces friction and prevents binding of shaft 3 inserted in the bearing. The coil spring can be inserted in support member 1 and be placed with great ease and speed as will be more fully explained hereinafter.

As it is shown in FIG. 1, the flattened threads on the outside of coil spring 5, together with the flanks 4a of the pointed threads in support member 1 define a continuous spiral or helical space 6 of triangular cross-section. This helical space may be utilized to store a suitable lubricant 7. The lubricant will be gradually released partly due to its viscosity and partly due to the slight displacements of the windings within the threads of the support member as the shaft is rotated and/or lengthwise displaced in the bearing; accordingly, the bearing is self-lubricating. The lubricant is substantially retained in its storage space when and while the shaft is at a standstill and is released only when required and to the extent the lubricant is needed.

Figure 3:
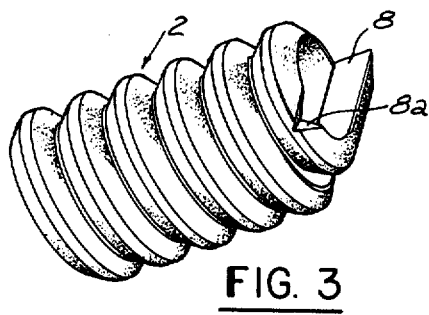
FIG. 3 is a perspective view of a bearing of the kind shown in FIG. 1, one end of the bearing coil terminating in a transverse tang.

FIG. 3 shows a bearing coil of the kind shown in FIG. 1 and described in connection therewith prior to the insertion of the coil into the threads of the support member. To facilitate such insertion the bearing coil terminates at one end in a transverse tang 8 which may be gripped by a suitable tool to screw the coil into the threads of the support member in the same manner as any threaded member may be screwed in. Upon completion of the insertion the tang is removed by applying a sharp blow to the same. To facilitate such removal of the tang, the same is notched at 8a.

Figure 4:
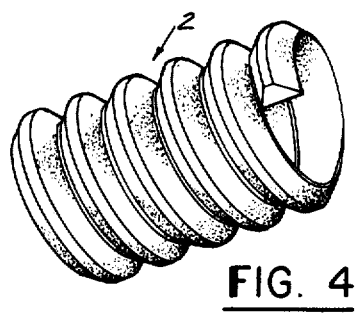
FIG. 4 is a perspective view of a modification of the bearing designed particularly for pressing the bearing into a smooth mounting hole formed in a comparatively soft material.

FIG. 4 shows a bearing coil which is intended primarily for insertion into an undersized smooth bore hole. The bearing coil of FIG. 4 is pushed into the hole in the material by means of an appropriate punch. The material of the support member may be for instance nylon or wood; generally a material which will accept the insertion of a member by force-fit.

Figure 5:
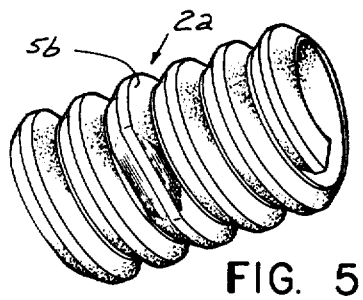
FIG. 5 is a perspective view of a bearing including a special winding for releasably locking an inserted shaft or rod in a predetermined rotational and/or axial position, and for preventing involutary rotational or lengthwise displacement of the shaft or rod.

FIG. 5 shows a bearing coil 2a which is similar in principle to the bearing coil described in connection with FIG. 1 in that the outer surfaces of the coil windings form a screw thread and the inner surfaces a spirally slotted cylindrical bearing surface, but different from the coil insert of FIG. 1 and also from the inserts according to FIGS. 3 and 4 in that one of the coil windings such as winding 5b is of at least partly reduced diameter. This coil winding constitutes either a lock winding by engagement with a corresponding recess in an inserted shaft or rod, as will be more fully explained hereinafter, or acts as a brake by gripping part of the engaged surface of the inserted shaft with a frictional grip.

FIG. 6 shows a bearing coil 2c which is similar to the bearing coil shown in FIGS. 1, 3 and 4 in respect to the external thread function and the internal bearing function. The bearing coil of FIG. 6 is distinguished from the bearing coils according to FIGS. 1, 3 and 4 in that the threads of the coil insert are formed with spirally spaced, preferably sharp-edged notches 10. Due to these notches the threads tend to dig into the material of the support member, especially if this material is comparatively soft, as has been described in connection with FIG. 4. Such strengthening of the anchorage of the coil bearing in the support member is particularly suitable if there is any danger that a rotating shaft may cause the bearing to rotate jointly with the shaft.

Any tendency of the coil bearing to be uncoiled out of its seatings by the rotation of the shaft may be further counteracted in the bearing according to FIG. 6 and, of course, also in the bearings according to the previously described figures by selecting the winding direction of the bearing coil opposite to the rotational direction of the shaft inserted therein.

The special locking coil described in connection with FIG. 5 may of course also be used in connection with the coil bearing according to FIG. 6.

FIG. 7 shows a bearing coil 2d in which an increased anchorage of the bearing coil in its mounting hole is effected by bending one of the end windings 5c out of the peripheral outline of the coil. When such coil is threaded into its mounting hole, the protruding winding portion and in particular the sharp edge at its end will exert a strong frictional pressure against the surrounding wall portions of the mounting hole due to its inherent bias, thus increasing the anchoring force with which the bearing coil is restrained against rotation in the hole.

Each of the coil inserts shown may be provided with a lock coil 5b as has been described in connection with FIG. 5.

FIG. 8 shows a double bearing formed by two bearings 2 of the kind described in connection with FIG. 1, each inserted in a threaded bore of a support member 1. However, instead of the bearing according to FIG. 1, bearings according to FIG. 4 or 6 may also be used. Furthermore, the bearings may be made self-lubricating, as has been described in connection with FIG. 2.

A double bearing according to FIG. 8 is particularly suitable to support a long, lengthwise slidable shaft 15. If necessary, more than two bearing units may be used. Structures of this type are frequently used in automotive and aircraft controls.

FIG. 9 is a double bearing similar to the double bearing of FIG. 8, except that the bearing insert 2a inserted in the mounting hole of the righthand bearing unit includes a locking coil winding 5b, as has been described in connection with FIG. 5. The locking winding is engageable with a circumferential groove 16a of a shaft or rod 16, to retain the shaft or rod in a predetermined axial position. To permit lengthwise displacement of the shaft or rod against the action of lock winding 5b, the side walls of the recess are slightly chamfered at 16b and conform to the similarly chamfered edges 5c of the coil wire.

Structures, as shown in FIG. 9, may be advantageously used as positioning stops for numerous types of push-pull controls. The lock coil exercises its braking effect in each lengthwise or rotational position of the control which it secures against involuntary displacement.

Conversely, a recess with radially straight side walls will positively retain a shaft or rod in its lengthwise position after lock winding 5b has snapped into recess 16a. An arrangement in which the shaft is positively retained in its lengthwise position may be advantageously used for instance for seating the drive shaft of a motor. The bearing prevents play and takes up thrust, thus constituting a highly effective and inexpensive thrust bearing which may be used instead of nut and washer or groove and spring-clip assemblies, as heretofore frequently provided for seating a rotary shaft. For instance, the shaft of a small motor may simply be pushed into a bearing according to the invention until the shaft is automatically retained in its proper position.

FIG. 10 shows the use of a bearing of the kind shown in FIG. 5. The lock winding 5b functions in FIG. 10 as a friction brake which retains a rotary and lengthwise slidable control rod 17 in an adjusted lengthwise and rotational position. While the lock winding 5b of FIG. 10 does not retain positively the shaft or rod in its adjusted position, the braking or restraining action of the lock winding is quite sufficient to overcome the action of shocks and vibration to which shafts or rods of the kind shown in FIG. 10 are frequently subjected. The controlled pressure action of FIG. 10 may be utilized in automotive controls in which, for example carburetor-idling control and choke control are frequently combined in a push-pull-turn control and is also advantageously applicable to switches, especially of the automotive type.

FIGS. 11, 12 and 13 show embodiments of the invention which may be advantageously used for a great variety of mechanical, electrical or electronic controls.

FIG. 11 shows a bearing of the kind described in connection with FIG. 5. The control rod 20 inserted in the bearing is formed with two circumferential chamfered grooves 21 and 21a. As it is evident and indicated in FIG. 1, rod 20 may be placed in a selected one of two predetermined positions or in a position in which the lock winding 5b engages a smooth portion of the shaft of the rod and restrains the rod in the respective position, as has been explained in connection with FIG. 10.

The arrangment of FIG. 11 may constitute for instance a three-position pull switch with turning action. Switches of this kind are frequently used to control automobile lights in several steps by pull and a rheostat for instrument lighting by turning.

The entire mechanical control of FIG. 11 is formed by a small coil spring insert which may be pressed in a plastic housing. The insert of the invention eliminates several components which were found heretofore necessary to effect click stops and to prevent lengthwise displacement of the control rod due to shock and vibration. In addition, the continuous pressure of the lock coil results in excellent grounding contact.

FIG. 12 shows a coil insert similar to the insert of FIGS. 5 and 11. The arrangement of FIG. 12 carries forward the concept of FIG. 11 in that a control rod 23 is not only retained in a predetermined lengthwise position but also in predetermined rotational positions. To this end, rod 23 is formed with a circumferential chamfered recess 23a which has a non-round cross section. The cross section is indicated in FIG. 12 to be square and as it is also indicated, rod 23 will be retained in a selected one of four predetermined rotational positions. Due to the inherent flexibility of coil winding 5a, rod 23 can be turned into another rotational position by overcoming the action of coil winding 5a.

FIG. 13 combines in effect the features and advantages of FIGS. 11 and 12. The bearing of FIG. 13 is the same as in FIGS. 11 and 12. The control rod 25 is formed with two circumferential chamfered recesses 25a and 25b. The rod portion at recess 25a is shown as having a hexagonal cross section and at recess 25b a square cross section. Of course, any other polygonal cross sections may also be provided. As it is evident, the recesses retain rod 25 in a selected one of several predetermined lengthwise positions, as has been described in connection with FIG. 11 and they also retain the rod in a selected rotational position as has been described in connection with FIG. 12.

A bearing according to the invention, for instance as shown in FIG. 5 may be used for establishing contact between a moving electrical conductor represented by the shaft and a stationary electrical component represented by the coil spring. Lock coil 5b of the coil spring will press against the shaft with a practically constant pressure, thus establishing a high quality connection. The constancy of the contact pressure may be still further improved by using the coil spring of FIG. 7. The distorted winding of this coil participates in the torsional spring action of the entire insert. The protruding winding portion 5c will bite into the surrounding wall material thus constituting a rigid anchor point. Since the spring is confined in a threaded housing in which it is rigidly held at its end, the spring pressure exerted by the locked coil must be and is for all practical purposes constant and remains so for a practically unlimited period of time while free springs such as leaf springs generally used in electrical switches become fatigued after a comparatively short time. It has been found that a contact device using the arrangement shown in the right half of FIG. 9 has such high contact qualities and permanency that it may be employed to replace slip rings and other expensive and complex components frequently used to effect contact between a moving member such as a rotary shaft and a stationary terminal.

As it is apparent from the description of FIGS. 11, 12 and 13, the arrangements described in these figures may be advantageously used to provide so-called "click" stops for electric switches. Rods 20, 23 and 25 seated in the bearings of these figures may be visualized as control rods of switches for controlling electrical or electronic equipment. Placement of a control rod in the selected one of several predetermined rotational or lengthwise positions will be clearly indicated by a distinctly audible click caused by coil winding 5b snapping into the groove in the rod. Click-stops in switches as heretofore known require generally several additional components, whereas such components are not necessary in the arrangement of the invention due to the inherent characteristics of the bearing.

Figure 2:
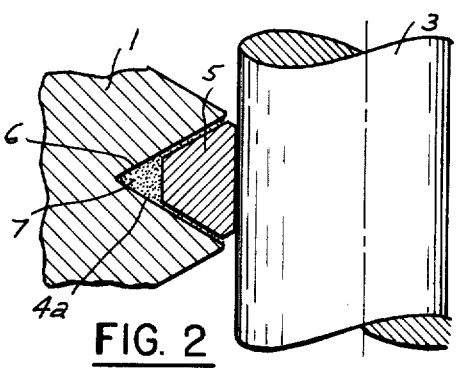
FIG. 2 is a fragmentary view of a bearing of the kind shown in FIG. 1, the bearing being filled with a lubricant.

A lubricant as described in connection with FIG. 2 may be advantageously used in connection with electric switching arrangements. For such applications the lubricant 7 should be an electrically conductive compound, such as a graphite compound. As the compound is gradually released it will effect a reduction of the ohmic resistance between the two components such as the bearing proper and the rod inserted therein in reference to each other.

FIGS. 14 and 15 show an exemplification of a tool for inserting coil inserts of the kind previously described. It may be pointed out in this connection that the use of the tool does not require a tang as shown in FIG. 3.

The tool comprises a guide rod 30 continued at its upper end in a shouldered portion 31 secured by any suitable means in a tool handle 32. The other end of rod 30 is continued in a mandrel 33 of reduced diameter and ending in a rounded tip 33a. Mandrel 33 has formed thereon one or several windings of a protruding screw thread 34 ending at 34a in a sharp edge. A guide sleeve 35 surrounds rod 30 and part of mandrel 33. The guide sleeve is slidable in reference to rod 30 and guided by the shoulder of rod portion 31. A spring 36 biases the sleeve into the forward position of FIG. 14.

To fit a bearing into the threaded mounting hole provided in support member 1 of FIG. 15 the forward end of the coil spring is fitted upon the mandrel so that the trailing end of the coil windings abuts the end 34a of threads 34 on mandrel 33. The diameter and the pitch of the windings on the mandrel are such that they will fit the threads in the mounting hole and also the winding diameter of the coil spring.

The tool can be conveniently and advantageously used for the insertion of coil bearings, such as shown in FIG. 3 (without tang) and FIG. 5, but it is particularly useful for the insertion of coil bearings which have a distorted end winding such as shown in FIG. 7.

After a coil bearing of the type shown in FIGS. 3 and 5 is fitted upon the tip of the mandrel as described, the bearing can be simply screwed into its mounting hole in the same manner as a standard screw bolt, as it is indicated in FIG. 15 by dotted lines. To insert a bearing coil of the type shown in FIG. 7, the same is fitted upon the mandrel as described. The protruding winding end 5c of the coil will push back sleeve 35 and retain the same temporarily in the pushed back position. When now the sleeve is pushed toward the tip of the mandrel and twisted at the same time, the sleeve will force the protruding winding end inwardly so that it can enter the sleeve which, in turn, will move forwardly into its normal position by the action of spring 36. The trailing end 5c of the bearing coil can now be brought into abutment with the leading edge 34a of thread 34 and the bearing coil can be screwed in as described. Upon completion of the insertion of the coil and withdrawal of the tool, the winding end 5c of the coil bearing will be retained in its bent-in position due to its engagement with the wall of the mounting hole, but will strongly anchor the bearing in the hole due to its outward bias.

Figure 16:
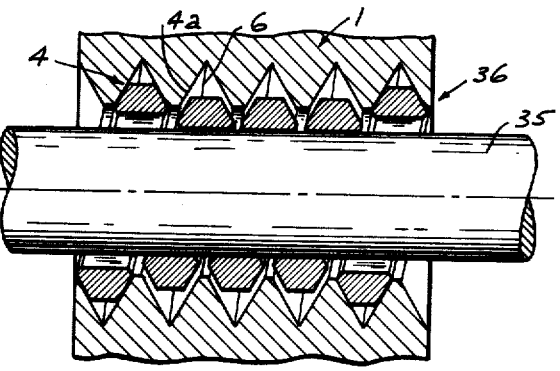
FIG. 16 is a lengthwise sectional view of a modification of a bearing according to the invention designed to compensate for misalignment between the center axis of the bearing and the center axis of a shaft or rod inserted therein.
Figure 17:
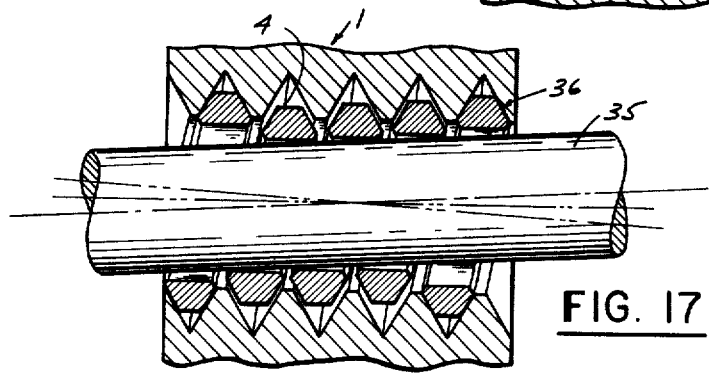
FIG. 17 shows the bearing of FIG. 16 and a shaft inserted in the bearing, tilted in reference to the bearing axis.

FIGS. 16 and 17 show a bearing of the general type previously described, but specifically designed to compensate for a slant or a bend of a shaft 35 inserted in the bearing.

The bearing again is formed by a coil spring 36. The wire from which the coil spring is wound has the afore-described cross section defining approximately a truncated triangle or a trapezium. The surfaces of the wire facing inwardly are flattened to form lands and the surfaces of the windings facing outwardly engage the thread of the mounting hole in support member 1. The spirally or helically shaped space 6 left between threads formed by the coil and the flanks 4a of the threads may be used to accommodate a lubricant 7, as has been described in connection with FIG. 2.

The bearing of FIGS. 16 and 17 is distinguished from the previously described bearings in that only the intermediate windings (three being shown) are axially aligned to define the aforedescribed spirally slotted cylindrical bearing surface. One or preferably both end windings are widened so that the lands of these end windings are outside of the peripheral outline of the bearing surface. As it is clearly shown in FIG. 16, the end windings are seated in the respective threads with a close fit, whereas the intermediate windings fit the threads with considerable play. As a result the bearing surface supporting shaft 35 and formed by the three intermediate or center windings is in effect elastically suspended from the end windings, or in other words, the shaft is elastically floating in the mounting hole. Due to such arrangement the shaft can tilt in respect to the center axis of the bearing within the limits indicated in FIG. 17 and the bearing structure of FIG. 16 will also compensate to a certain extent for the bending of the shaft. FIG. 17 shows quite clearly that the end windings remain in the positions which they occupy in FIG. 16 while the intermediate or bearing windings either move deeper into or more out of the threads 4 depending upon the extent of misalignment or bending of shaft 35.

A bearing capable of compensating for misalignment or bending of a shaft or rod is highly useful, for instance for push-pull controls in which misalignment or bending of the control rod occurs not infrequently.

Figure 18:
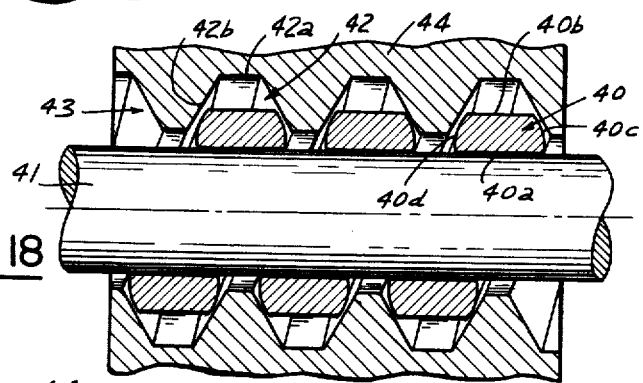
FIG. 18 shows another modification of the bearing compensating for tilting of the seated member in reference to the bearing axis.
Figure 19:
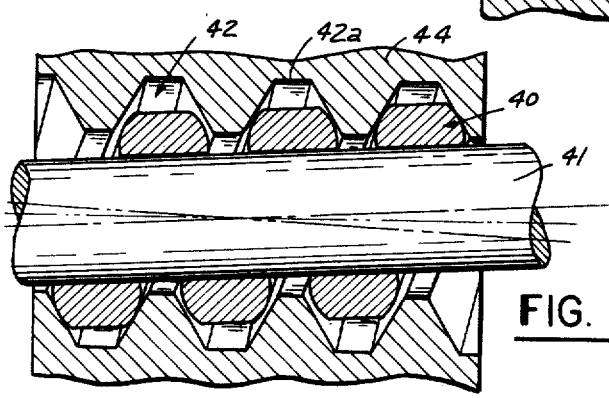
FIG. 19 shows the bearing of FIG. 18 seating a shaft misaligned in reference to the bearing axis.

FIGS. 18 and 19 show a bearing employing the previously described general principle of the invention and also designed to compensate for misalignment or bending of a member seated in the bearing. The bearing of FIGS. 18 and 19 is designed specifically for seating heavier loads which may overload the elastically suspended intermediate or center coil windings of FIGS. 16 and 17.

The wire 40 from which the coil spring of FIGS. 18 and 19 is wound has again such cross section that it will perform a bearing function at its inside and a screw function at its outside. Accordingly, the surfaces of the windings facing inwardly form lands 40a to define a spirally slotted cylindrical bearing surface for a shaft 41. The outwardly facing surfaces of the windings are flattened at 40b but in contra-distinction to the previously described cross sections of the coil wire the flattened portions 40a and 40b of the wire are joined by flanks 40c and 40d concavely curved in reference to each other. The thread 42 formed in mounting hole 43 of support member 44 is shown as being axially widened at its base 42a. As it is apparent, the afore-discussed trapezium shape of the coil wire is still generally preserved and each winding engages the respective thread in the support member. Due to the coaction of the rounded flanks 40c and 40d with the straight flanks 42b of the threads in the mounting hole, the individual coil windings can to a certain extent roll or twist in reference to the threads in the mounting hole.

FIG. 19 shows a shaft or rod 41 inserted in the bearing and misaligned in reference to the center axis of the bearing. A comparison of the positions occupied by the individual windings of the bearing in FIG. 18 with the positions occupied by the individual bearings in FIG. 19 shows very clearly the manner in which the individual windings have changed their positions in reference to each other and to threads 42 to accommodate for the slant or bending of shaft 41, the curved side flanks 40c and 40d permitting such adjustment.

The bearing as shown in FIG. 18 may of course also be made self-lubricating. Furthermore, all of the adjustment control features and the capability of electrically connecting a moving component and a stationary component described in connection with the previous figures apply to the bearings of FIGS. 16 and 18 also.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In combination: a support member having an internally threaded mounting hole and a bearing insertable into said mounting hole, said bearing comprising a coil spring having windings externally defining screw threads engageable with the threads of the mounting hole and internally defining axially aligned lands, said lands in conjunction forming a spirally slotted cylindrical bearing surface, the maximum outer diameter of said coil windings being less than the maximum diameter of the threads in the mounting hole thereby forming between the support member and the coil spring storage space for a lubricant when the threads of the latter are engaged with the threads in the support member.

2. In combination: a shaft bearing insertable into a mounting hole, said bearing comprising a coil spring having windings externally defining screw threads engageable with the wall of said mounting hole and internally defining axially aligned lands, said lands in conjunction forming a spirally slotted cylindrical bearing surface, one of the coil windings being of reduced diameter to protrude into the space defined by said cylindrical bearing surface, and a shaft slidably fittable in said bearing, said shaft having a circumferential recess engageable with said protruding winding to retain the shaft in a predetermined lengthwise position in reference to the bearing.

3. The combination according to claim 2 wherein the circumferential sides of said recess are outwardly slanted whereby said shaft is releasable from its said retained position by overcoming the spring action of said protruding winding.

4. The combination according to claim 2 wherein said recessed shaft portion has a polygonal cross section for releasably retaining the shaft in a selected one of several predetermined rotational positions against the spring action of said protruding winding.

5. A bearing assembly comprising, in combination, a support member including a mounting hole bounded by threads of substantially triangular cross-sectional outline, and a bearing coil spring wound of wire having a cross-sectional configuration approximately defining a trapezium, the wide side of the coil windings facing inwardly and being axially aligned to define in conjunction a spirally slotted cylindrical bearing surface and the narrow side of the windings facing outwardly to define flattened screw threads engageable with the threads in the mounting hole, the spring threads in conjunction with the threads in the mounting hole forming a continuous helical gap constituting a reservoir for a lubricant.

6. A bearing assembly comprising, in combination, a support member including a threaded mounting hole, and a bearing coil spring, the inwardly facing sides of the coil windings being axially aligned to define in conjunction a spirally slotted generally cylindrical bearing surface, and the outwardly facing sides of the coil windings in conjunction with the threads in the mounting hole defining a continuous helical gap constituting a reservoir for a lubricant.

7. A bearing assembly comprising, in combination, a support member including a threaded mounting hole, and a bearing coil spring, the inwardly facing sides of the coil windings being axially aligned to define in conjunction a spirally slotted generally cylindrical bearing surface, and the outwardly facing sides of the coil windings being blunted and having a maximal outer diameter less than the maximal inner diameter of the threads in said mounting hole, the spring threads in conjunction with the threads in the mounting hole defining a continuous helical gap constituting a reservoir for a lubricant.

8. A bearing assembly comprising, in combination, a support member including a threaded mounting hole and a bearing coil spring, the inwardly facing sides of the coil windings being flattened and axially aligned to define in conjunction a spirally slotted generally cylindrical bearing surface and the outwardly facing sides of the coil windings being also flattened and having a maximal outer diameter less than the maximal inner diameter of the threads in said mounting hole to define screw threads engageable with the threads in the mounting hole, the spring threads in conjunction with the threads in the mounting hole constituting a reservoir for a lubricant.

9. A bearing insertable into a threaded mounting hole, said bearing comprising a coil spring having several intermediate windings of uniform diameter and at least one end winding of greater diameter, said coil windings externally defining screw threads engageable with the threads in the mounting hole and internally defining lands, the lands defined by said intermediate windings being axially aligned to form in conjunction a spirally slotted cylindrical bearing surface; and a support member having a threaded mounting hole, the external threads defined by the intermediate coil windings fitting the threads in the mounting hole with play and the external thread of the enlarged end winding fitting the respective thread in the mounting hole with a substantially close fit, whereby a shaft inserted in said bearing is capable of bearing engagement with said bearing surface in a position of slant in reference to the center axis of the mounting hole.

References Cited by the Examiner

UNITED STATES PATENTS

| 1,200,060 | 10/16 | Wemp | 308—240 |
| 1,454,682 | 5/23 | Layne | 308—240 |
| 1,745,425 | 2/30 | Johnson | 308—240 |
| 1,746,981 | 2/30 | Anderson | 308—240 |
| 1,858,315 | 5/32 | Thatcher | 308—240 |
| 2,227,762 | 1/41 | Ronning | 267—58 |
| 2,278,324 | 3/42 | Kollmann. | |
| 2,491,558 | 12/49 | Hanson | 308—240 |

FOREIGN PATENTS 81,712  11/19  Switzerland.

ROBERT C. RIORDON, *Primary Examiner.*

FRANK SUSKO, *Examiner.*